United States Patent [19]
Lin et al.

[11] Patent Number: 5,949,415
[45] Date of Patent: *Sep. 7, 1999

[54] METHOD AND APPARATUS FOR TRACKING PROGRAM USAGE IN A COMPUTER SYSTEM

[75] Inventors: Chihuan Michael Lin; Lani Jean Tan, both of Chandler, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/762,580

[22] Filed: Jun. 16, 1997

[51] Int. Cl.⁶ .................................................. G06F 11/34
[52] U.S. Cl. ............................................ 345/335; 345/357
[58] Field of Search ..................................... 345/335, 333, 345/326, 336, 339, 340, 356, 357, 341–347, 348, 352–355, 334; 395/200.11, 200.2

[56] References Cited

U.S. PATENT DOCUMENTS

| | | | |
|---|---|---|---|
| 5,528,507 | 6/1996 | McNamara et al. | 364/483 |
| 5,537,550 | 7/1996 | Russell et al. | 395/200.54 |
| 5,553,239 | 9/1996 | Heath et al. | 395/187.01 |
| 5,586,121 | 12/1996 | Moura et al. | 370/404 |
| 5,592,540 | 1/1997 | Beveridge | 379/184 |
| 5,644,718 | 7/1997 | Belove et al. | 395/200.57 |
| 5,655,008 | 8/1997 | Futch et al. | 379/91.01 |
| 5,694,549 | 12/1997 | Carlin et al. | 395/200.2 |
| 5,710,887 | 1/1998 | Chelliah et al. | 395/226 |
| 5,712,979 | 1/1998 | Graber et al. | 395/200.11 |
| 5,717,860 | 2/1998 | Graber et al. | 395/200.12 |

*Primary Examiner*—Steven P. Sax
*Attorney, Agent, or Firm*—Kenyon & Kenyon

[57] ABSTRACT

An embodiment of the present invention provides a method for monitoring application program usage in a computer system having an operating system which controls execution of one or more application programs, with each application program consisting of an executable task and one or more executable subtasks. The method includes the steps of detecting an executable task or subtask executing under the operating system, identifying an application program associated with the executable task or subtask, and tracking information relating to execution of the task or subtask in a manner that does not interfere with their execution.

21 Claims, 2 Drawing Sheets

METHOD AND APPARATUS FOR
TRACKING PROGRAM USAGE IN A
COMPUTER SYSTEM

BACKGROUND OF THE INVENTION

The present invention relates generally to the field of computer system resource management, and in particular to a method and apparatus for tracking program usage.

In an effort to capitalize on the rapidly-expanding market for on-line computer services, local cable television operators have begun investigating ways of providing on-line computer services to subscribers over existing cable networks. An attractive selling feature for such services is dramatically-improved access speed enabled by hybrid fiber coax cable networks, as compared to the often frustratingly-slow access speeds available with the more common POTS (Plain Old Telephone System) access methods.

A key challenge faced by cable operators, both from a technical and a business standpoint, is how to bill subscribers for the on-line services they receive. One possible approach is to use the same method currently employed by most cable operators for television services; namely, a flat monthly rate for unlimited usage. This approach is rather inflexible, however, tending to punish low-volume users while conferring a windfall of sorts on high-volume users. Moreover, while subscribers for television services are accustomed to such flat-fee billing practices, many current users of on-line services are accustomed to billing practices more closely tailored to their actual usage. Most on-line service providers can bill customers at an hourly rate based on actual usage. It is therefore desirable for cable operators to be able to offer this same type of flexible billing.

Another challenge faced not only by cable operators, but more generally by any entity providing on-line services, is how to tailor information or services to the particular desires of individual clients. One way in which this is done is by maintaining individualized "profiles" for subscribers. A user profile can be a highly-effective marketing tool, enabling a service provider to offer specialized services or content to subscribers based on their individual interests and preferences. Such profiles have commonly been created with the aid of a user survey. A less intrusive, and therefore more desirable, method of compiling a user profile would be to gather information about the applications actually used by a subscriber.

One way in which a cable operator may provide on-line services to subscribers involves an arrangement in which the cable operator maintains a central (server) computer accessible by large numbers of subscriber (client) computers over standard cable connections. The cable operator's server may itself provide on-line services to subscribers, such as Internet access, or it may function as a proxy through which subscribers can access other on-line service providers (OSPs), such as AmericaOnline™ and Prodigy™. Combinations of these methods are also possible.

To facilitate a client-server arrangement of this type, a cable operator may furnish software for installation on a client computer providing an interface for accessing on-line services from or through the cable operator's server. Such client software would typically permit a subscriber to browse and launch cable-specific applications (that is, applications provided directly or indirectly by the cable operator's server). As noted above, it may be desirable for both billing and marketing purposes for the client software to track the subscriber's usage of cable-specific applications and periodically report such information back to the server.

Unfortunately, tracking application program usage is not necessarily a straight-forward process, particularly in a Windows™3.n/95 or similar multitasking operating environment.

Multitasking (the ability to concurrently run multiple applications) is a characteristic feature of any Windows™ or Windows™-like operating system. Such operating systems generally maintain a system task list identifying all currently-running applications. Relatively little information is kept in the system task list, however, usually being limited to a handle for locating the application and perhaps a title. System task lists of this type notably fail to provide detailed information concerning relationships between or among active applications. For example, a so-called "parent" application may spawn several "child" tasks, all of which would appear separately in the system task list. Moreover, a parent application may spawn a child task and then immediately terminate, in which case only the child task appears in the system task list, likely with attributes that are entirely different from those of the parent task.

Tracking the relationships between parent and child tasks can be highly useful, especially in the context of the above-described client-server application. For example, a cable operator may choose to bill a subscriber only in terms of a parent application, but have the usage total for the parent application reflect any usage of applications spawned by that parent application. Unfortunately, due to the various permutations in the way programs may be implemented in a multitasking environment, as well as the limited information about task relationships typically available from such systems, it becomes a difficult and complicated undertaking to accurately track program usage with currently-available technology.

SUMMARY OF THE INVENTION

An embodiment of the present invention provides a method for monitoring application program usage in a computer system having an operating system which controls execution of one or more application programs, with each application program consisting of an executable task and one or more executable subtasks. The method includes the steps of detecting an executable task or subtask executing under the operating system, identifying an application program associated with the executable task or subtask, and tracking information relating to execution of the task or subtask in a manner that does not interfere with their execution.

Such embodiments may be particularly useful when applied in a client-server arrangement in which a server computer receives information relating to a client computer's use of application software for the purpose of billing the client user based on the extent of such usage. An example of such a client-server arrangement is where a cable operator provides application program services to subscribers under a usage-based billing arrangement.

DETAILED DESCRIPTION

Figure 1:
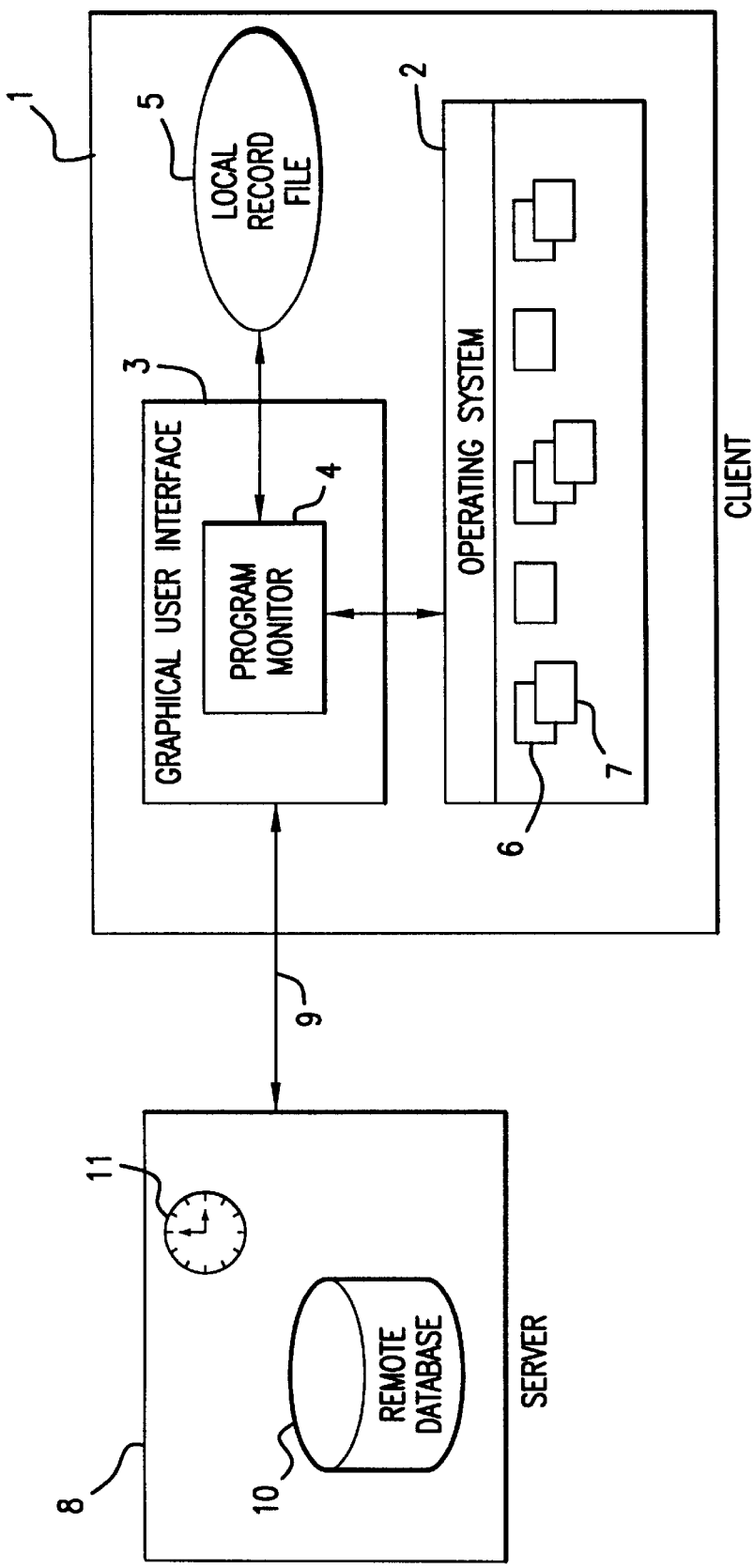
FIG. 1 is a schematic diagram illustrating the architecture for an embodiment of the present invention.

The present invention provides a method and apparatus for tracking program usage in a computer system. FIG. 1 illustrates schematically the system architecture for an embodiment of the present invention. In this embodiment, a client computer 1 is coupled to a server computer 8 by a communications link 9. Client computer 1 includes a graphical user interface 3 which enables a user of client computer 1 to launch a variety of displayed application programs. Launched application programs run under the control of an operating system 2 installed on client computer 1. Graphical user interface 3 may launch zero or more tasks 6, corresponding to displayed application programs, and each task 6 may in turn launch zero or more subtasks 7.

Graphical user interface 3 includes a program monitor 4 configured to track program usage information for applications launched by graphical user interface 3. To this end, program monitor 4 maintains a local record file 5 with current status information relating to tasks 6 and subtasks 7 running under operating system 2. Program monitor 4 may also update a remote database 10 resident on server computer 8 with program usage information, preferably identifying such information in a manner which uniquely associates it with client computer 1 to enable server computer 8 to separately maintain program usage information for a plurality of clients. Server computer 8 preferably includes a remote timer 11 which program monitor 4 may use as a trusted time source.

Client computer 1 may be, for example, a standard desktop or notebook personal computer. Alternatively, client computer 1 may be a specially-configured television including user interface software. Server computer 8 is preferably a dedicated personal computer configured as a network server, but may alternatively be a minicomputer or mainframe computer providing similar functionality. Communications link 9 may be any suitable means for enabling two computers to communicate with one another, including a hybrid fiber coax network, a fiberoptic cable, a POTS connection, or even a wireless connection. Depending upon the particular characteristics of communications link 9, client computer 1 may include specialized software and/or hardware, such as a modem, to enable digital or analog communications between client computer 1 and network computer 8 across communications link 9. This embodiment is not dependent upon any particular type of communications link 9.

Operating system 2 is preferably a Windows™ 3.n/95 operating system, although embodiments of the present invention may be advantageously applied in other operating environments as well. Operating system 2 is capable of managing a plurality of concurrently running tasks 6, each of which in turn may spawn one or more subtasks 7. For example, a program driving the "main window" of an on-line service would represent a task, while an Internet browser program available form the main window would represent a subtask. A task with one or more subtasks is referred to as a "parent," with the respective subtasks referred to as "children." Operating system 2 permits a user to toggle among active tasks 6 and subtasks 7, and preferably maintains a system task list identifying tasks 6 and subtasks 7 currently running under operating system 2.

Where operating system 2 is a Windows™ system, program monitor 4 is preferably implemented as a dynamic link library (DLL). In the present embodiment, program monitor 4 is implemented as a sub-module of graphical user interface 3, and is principally concerned with tracking tasks 6 and subtasks 7 launched either directly or indirectly by graphical user interface 3. Alternatively, program monitor 4 may be implemented more in the nature of a stand-alone utility which tracks all tasks 6 and subtasks 7 running under operating system 2 regardless of their origin.

Program monitor 4 may be distributed as pre-loaded software (comprising a set of executable instructions) resident in a memory of a personal computer, such as the hard-disk of a notebook computer. Alternatively, the software may be distributed to users in the form of a user-installable program stored on any of a variety of portable media, including diskette and CD. Yet another possibility is that the software could be made available on a network server for downloading upon request by a user.

Program monitor 4 maintains usage information relating to tasks 6 and subtasks 7 in local record file 5. Local record file 5 may be implemented in a Windows™ environment as a Windows™ initialization file (.INI extension); however, local record file 5 may be any data store resident on client computer 1 to which program monitor 4 has read/write access. Local record file 5 preferably resides on a "permanent" storage medium, such as a hard disk of client computer 6, so that information in local record file 5 is retained between usage sessions. Local record file 5 may store a variety of information concerning tasks 6 and subtasks 7 running under operating system 2, such as a LaunchID for each task 6 launched by graphical user interface 3 and a total number of active tasks 6 and subtasks 7. The particular information maintained may vary with the requirements of any given implementation.

Remote database 8 is preferably an SQL (Structured Query Language) database, although this embodiment is not dependent upon the use of any particular type of database. Program monitor 4 is capable of reading data from and writing data to remote database 10 over communications link 9 using, for example, standard SQL calls. Remote timer 11 may be, for example, a software-implemented function configured to return a reliable system time upon request by a calling routine. Program monitor 4 is capable of reading a system time from remote timer 11.

Where operating system 2 is a Windows™ 3.n/95 system, program monitor 4 may be implemented as a Windows™ callback function which is called by the Windows™ dynamic link library "TOOLHELP.DLL" whenever a task starts or ends. In such an embodiment, program monitor 4 may be configured to process all Windows™ messages generated by starting or terminating tasks, thereby enabling it to track information relating to program usage. As is known in the art, the message-handling code within program monitor 4 preferably uses a non-blocking mechanism due to the sensitive nature of the Windows™ multitasking environment.

Figure 2:
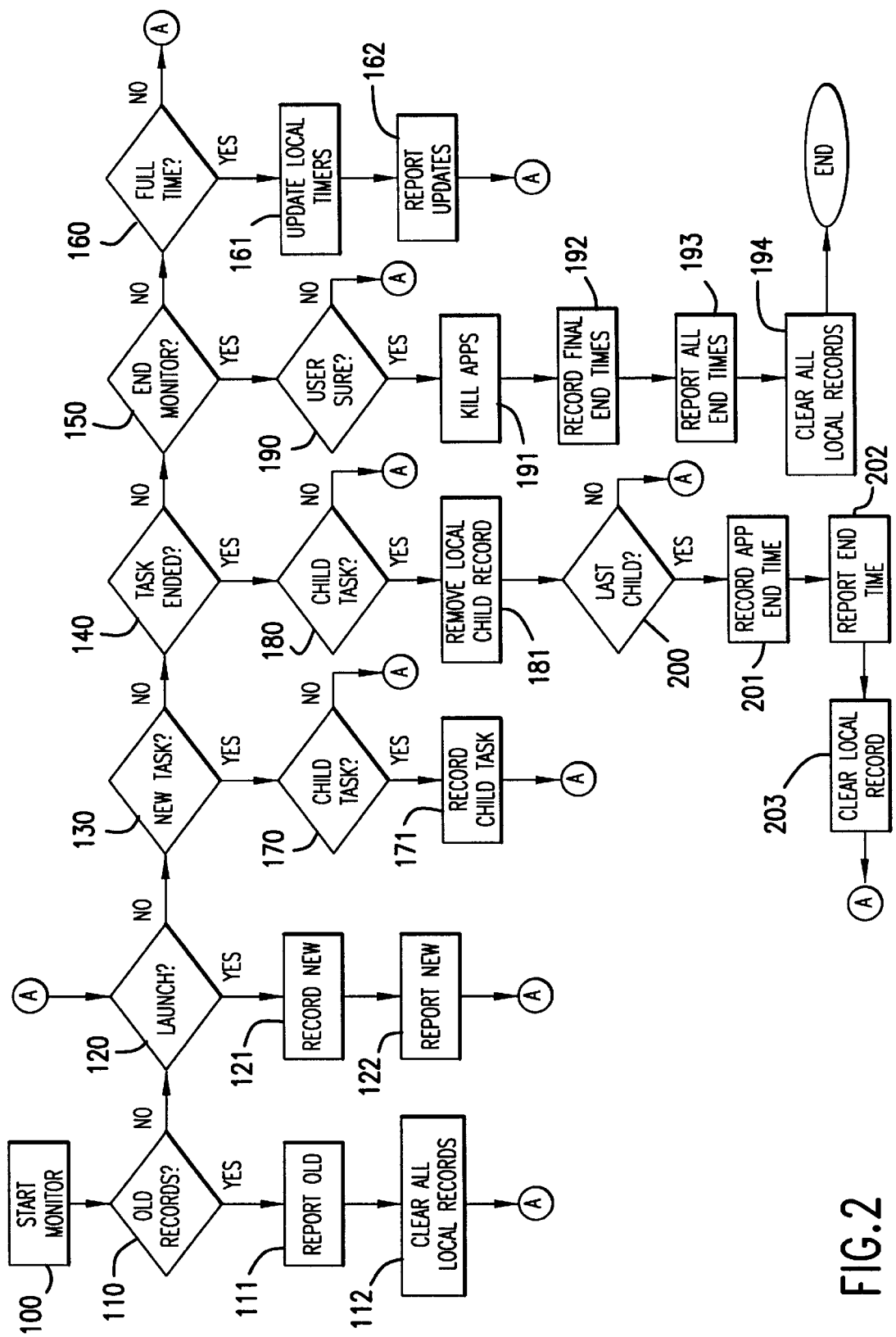
FIG. 2 is a flow diagram illustrating the processing logic for an embodiment of the present invention.

Turning now to functional features of the present invention, FIG. 2 describes a method for tracking program usage according to an embodiment of the present invention. For illustration purposes, structural features are identified using the same reference numbers used in FIG. 1; however, the method of FIG. 2 is not limited to that structural embodiment. In this latter embodiment, the total execution time for a launched application is defined as the time period between (a) the start time of the first task spawned by the application, and (b) the end time for the last active task or subtask spawned by the application.

Referring now to FIG. 2, processing begins when program monitor 4 receives a callback message from operating system 2. Program monitor 4 inspects the callback message to determine whether a task is being started or is ending. In a Windows™ environment, the callback message will include a unique identifier, or handle, for the task. If a task is being started, program monitor 4 further determines whether the task is the first task of an application launched by graphical user interface 3 (Step 120). If so, program monitor 4 calls network computer 8 with a request for the current system time from remote timer 11. Program monitor 4 then creates a new application record in local record file 5 (Step 121). The new application record preferably includes a unique LaunchID for the application, assigned by program monitor 4, a StartDateTime based on the retrieved current system time, and a projected EndDateTime for use in the event graphical user interface 3 terminates prematurely, for example, due to a power outage. The projected EndDateTime may initially be set to some predetermined time period after the StartDateTime, such as twenty seconds.

Since, in this example, the current task is the first task spawned by the launched application, program monitor 4 also adds a task record to local record file 5. The task record preferably includes a unique TaskID, such as the Windows™-assigned task handle, as well as the LaunchID to associate the task with the newly-launched application. Task records in local record file 5 also preferably include a parent/child flag indicating whether the task being started is the first task spawned by an application (the parent) or a subtask (a child).

Program monitor 4 may use certain Windows™ API functions to retrieve information about active tasks. For example, the GetCurrentTask( ) function may be used to retrieve the handle for a currently-running task 6 or subtask 7. The TaskFindHandle( ) function may then be used to retrieve additional information about the task 6/subtask 7 associated with the retrieved handle. TaskFindHandle( ) fills a data structure called TASKENTRY. TASKENTRY includes an InTaskParent variable that identifies whether the task 6/subtask 7 is a parent or a child.

Task records may be implemented as an array of TaskIDs contained within an application record. In another arrangement, task records may be separate physical records associated with an application record in a hierarchical data structure. The parent/child designation enables program monitor 4 to continue tracking program usage information for a given application for as long as tasks spawned directly (parent) or indirectly (children) by that application are running, even where a parent task has terminated. Program monitor 4 is also capable of tracking program usage for multiple instances of a given program, since the operating system views each such instance as a distinct task.

Once the new application record is built in local record file 5, program monitor 4 reports the LaunchID and EndDateTime, along with a ClientID, to server computer 8 for storage in remote database 10 (Step 122). The ClientID, assigned by program monitor 4, uniquely associates the program usage information with client computer 1, and may comprise the TCP/IP address for client computer 1. This association may be made even more specific by appending a UserID to the TCP/IP address, thereby enabling server computer 8 to individually track program usage for multiple users of client computer 1.

Maintaining program usage information both in client computer 1 and server computer 8 is advantageous for a variety of reasons. For example, such redundant record keeping helps prevent abuse by a user of client computer 1, such as altering the contents of local record file 5. Additionally, maintaining program usage information at server computer 8 helps ensure system integrity in the event of an abnormal termination of an application program launched by a monitored application, or even an abnormal termination of program monitor 4 itself.

Program monitor 4 next determines whether the task being processed is a new task (Step 130). This may be accomplished, for example, by searching the application records in local record file 5 for a record having a TaskID matching the task identifier in the callback message. Where a task is being started, this decision should always have an affirmative result because task records are normally purged after a task ends. Assuming no task record is found, program monitor 4 determines whether the present task is associated with a previously-launched application and, if so, builds a new task record in local record file 5 using the appropriate TaskID and LaunchID, setting the parent/child indicator to flag the task as a child task (Step 171).

The foregoing describes the processing which may be performed when a callback message received by program monitor 4 relates to a task being started. Where the callback message relates instead to a task that is ending, program monitor 4 determines whether the task is associated with an application that was launched by graphical user interface 3 (Step 140). As above, this may be accomplished by searching local record file 5 for an entry having a TaskID matching the task identifier in the callback message. If a match is found, program monitor 4 removes the task record from local record file 5 (Step 181) and checks whether any other tasks are active for the application (Step 200). If the terminating task is the last active task, program monitor 4 calls server computer 8 to retrieve the current system time from remote timer 11 and records that time in the EndDateTime field of the appropriate application record in local record file 5 (Step 201). Program monitor 4 then reports this "final" EndDateTime to server computer 8 (Step 202). Upon receipt of a confirmation from server computer 8 that remote database 10 was updated with the EndDateTime, program monitor 4 deletes the application record from local record file 5 (Step 203).

In the processing described above, program monitor 4 acted upon callback messages from operating system 2. Additionally, or alternatively, program monitor 4 may perform certain processing on a periodic basis. For example, at timed intervals program monitor 4 may retrieve the current system time from server computer 8 to update the default EndDateTimes for all monitored applications represented in local record file 5 (Step 161). Likewise, program monitor 4 may report these updated default EndDateTimes to server computer 8 (Step 162). Program monitor 4 may also perform file maintenance at periodic intervals, such as deleting records from local record file 5 that relate to tasks 6 that are no longer active (and that have no active subtasks 7).

As illustrated in FIG. 2, program monitor 4 may also perform special processing at start-up (Step 100) and termination (Step 150). For example, when a user of client computer 1 starts graphical user interface 3, program monitor 4 may first process any "unreported" application records in local record file 5. Such records might result from an abnormal termination of graphical user interface 3, in which case local record file 5 could contain application records relating to tasks that also abnormally terminated or that terminated normally while graphical user interface 3 was not running. In either case, it is desirable for program monitor 4 to report a final EndDateTime to server computer 8. Assuming program monitor 4 had been periodically updating the default EndDateTimes in local record file 5 as described above, the unreported application record should already contain the best available approximation of the actual end time for applications being monitored when graphical user interface 3 terminated. Accordingly, program monitor 4 need only report these EndDateTimes to server computer 8 (Step 111). Upon receipt of confirmation that remote database 10 was successfully updated, program monitor 4 may purge the old application records from local record file 5.

When a user of client computer 1 requests that graphical user interface 3 be terminated (Step 150), program monitor 4 preferably issues a message warning the user that any active applications may be terminated, and asking the user to confirm the request (Step 190). Assuming the user confirms, program monitor 4 causes all tasks associated with applications being monitored to terminate (Step 191). For each such application, program monitor 4 updates the corresponding records in local record file 5 with the final EndDateTimes (Step 192). To determine the final EndDateTimes, program monitor 4 may again retrieve the current system time from server computer 8, or it may use a locally-maintained time derived from the most recently retrieved system time. Program monitor 4 then reports the EndDateTimes for each application that was terminated to server computer 8 (Step 193). Upon receipt of a confirmation from server computer 8 that remote database 10 was updated with the EndDateTime, program monitor 4 deletes the application records from local record file 5 (Step 194) and terminates execution.

While the description of the foregoing embodiment of program monitor 4 assumed operating system 2 generated callback messages whenever tasks were started or stopped, an alternate approach may be used to track program usage where operating system 2 lacks such callback capability. On a periodic basis, program monitor 4 may poll operating system 2 looking for active tasks. So long as operating system 2 maintains unique identifiers for active tasks, program monitor 4 may track program usage in essentially the same manner as described above. Rather than being informed of task starts and stops by operating system 2, however, program monitor 4 deduces this information from the presence or absence of active tasks and subtasks. In this embodiment, the accuracy of the application start and stop times provided by program monitor 4 will depend upon the length of time between polls. Shortening the polling interval will increase the accuracy of the application usage times.

The following describes a record layout for local record file 5 according to an embodiment of the present invention. As shown, local record file may be segmented into sections containing one or more fields. The particular order of the sections is not critical. Section names are designated by brackets ("[ . . . ]"), while field names are designated by opposing arrowheads ("< . . . >").

| | |
|---|---|
| [INI_APPUSAGEID] | Application Usage Header Section |
| <UsageID> | An identifier assigned by the graphical user interface which may be used to unambiguously associate applications with a particular user and/or session. |
| [INI_DBNWERRMSG] | Application Message Section |
| <ErrMsg#> | Used to record errors occurring during processing by the program monitor, such as the inability to update the remote database with application end times. |
| [INI_APPTIME] | Application End Times Section |
| <LaunchID> | An identifier assigned by the program monitor for an application launched by the graphical user interface. For each LaunchID in this file, there is a corresponding [INI_APPLAUNCH] section with entries for the parent task and any child tasks. |
| <TotalLaunch> | The number of launched applications currently running. This number should equal the number of LaunchIDs in this file. |
| <StartDateTime> | Actual start time for the launched application, preferably derived from trusted remote timer. |
| <EndDateTime> | End time for the launched application, initially set to default value for use at start-up in the event the program monitor abnormally terminated in its last session. |
| <ServiceName> | Name of service associated with launched application. |
| <MappedDrive> | Drive path to launched application. |
| <UsageLogID> | Uniquely identifies an entry in the remote database associated with the launched application. |
| <Total Executing> | Number of active tasks and subtasks associated with the launched application. |
| [INI_APPLAUNCH] | |
| <ParentTaskID> | Unique identifier for active parent task of launched application. There can be only one parent task for any given application. This identifier may be comprised of a LaunchID and an operating system-assigned task handle. |
| <ChildTaskID> | Unique identifier for active child (subtask) of a launched application. There can be multiple subtasks for any given application. This identifier may be comprised of a LaunchID and an operating system-assigned task handle. |

The above-described embodiments of the present invention may be applied, for example, in a system by which a local cable operator provides subscribers with access to a variety of on-line applications over a hybrid fiber coax network. By installing a program monitor such as that described above on the subscriber's personal computer, either as a stand-alone module or as part of a graphical user interface, the cable operator can monitor the on-line applications that any particular subscriber accesses. This information could be transmitted back to central computer maintained by the cable operator for use in generating usage-based bills or for compiling user profiles.

The foregoing is a detailed description of particular embodiments of the present invention as defined in the claims set forth below. The invention embraces all alternatives, modifications and variations that fall within the letter and spirit of the claims, as well as all equivalents of the claimed subject matter. For example, rather than being implemented in a client-server arrangement, embodiments of the present invention may be implemented in a LAN or some other distributed processing architecture. Persons skilled in the art will recognize from the foregoing detailed description that many other alternatives, modifications and variations are possible.

What is claimed is:

1. A method for monitoring application program usage in a client computer, the client computer having an operating system which controls execution of an application program initiating a task capable of spawning one or more subtasks, wherein the operating system views each of said task and subtasks as a distinct executable program, said method comprising the steps of:

detecting a task or subtask executing under the operating system;

identifying the application program associated with the detected task or subtask;

tracking in the client computer information relating to execution of the detected task or subtask in a manner that does not interfere with said execution; and associating with the identified application program tracked information relating to execution of the task initiated by said application program and tracked information relating to execution of all subtasks spawned by said task.

2. The method of claim 1, wherein the client computer includes a local data store, said step of tracking information comprising recording information in the local data store.

3. The method of claim 2, wherein the client computer is coupled to a server computer including a remote data store, said method further comprising the step of transmitting a portion of the information recorded in the local data store to the server computer to update the remote data store.

4. An instruction set residing on a storage medium for tracking program usage on a client computer, the client computer enabling a user to launch one or more application programs and including an operating system executing the launched application programs, each application program causing the operating system to execute a task and zero or more subtasks, wherein the operating system views each of said task and subtasks as a distinct executable program, said instruction set comprising instructions for:

identifying a launched application program;

detecting a task initiated by the launched application program;

detecting any subtasks initiated directly or indirectly by the task;

compiling information in the client computer relating to the task and subtasks in a manner that does not interfere with their execution; and associating with the launched application program compiled information relating to execution of the task initiated by the launched application program and compiled information relating to all subtasks initiated directly or indirectly by the task.

5. The instruction set of claim 4, wherein the client computer is coupled to a server computer, said instruction set further comprising instructions for transmitting a portion of the compiled information to the server computer with a unique identifier for the client computer.

6. The instruction set of claim 4, wherein the client computer includes a local data store, said instruction set further comprising instructions for storing a record containing the compiled information in the local data store, said instructions for detecting a task initiated by the launched application program including instructions for:

identifying a task being executed by the operating system; and designating the identified task as a newly-initiated task when the local data store does not contain a record associated with the identified task.

7. The instruction set of claim 6, further comprising instructions for designating the identified task as a task being terminated when the local data store contains a record associated with the identified task.

8. The instruction set of claim 4, wherein the operating system maintains a system task list identifying active tasks and substasks, said detecting steps comprising interrogating the system task list and extracting an identifier for an active task or subtask.

9. The instruction set of claim 4, wherein the operating system generates a callback message when a task or a subtask is initiated, said detecting steps comprising receiving the callback message and extracting an identifier for an initiated task or subtask.

10. The instruction set of claim 4, wherein the storage medium comprises a portable magnetic storage device.

11. The instruction set of claim 4, wherein the storage medium comprises a downloadable data set residing on a remotely-accessible central computer.

12. The instruction set of claim 4, wherein the storage medium comprises a hard-disk of the client computer.

13. A program monitor for monitoring program usage in a client computer including an operating system configured to manage execution of an application program initiating a task capable of spawning one or more subtasks, wherein the operating system views each of said task and subtasks as a distinct executable program, said program monitor being resident in the client computer and comprising:

means for recognizing an action by the operating system on a task or subtask;

means for identifying an application program associated with the task or subtask acted upon by the operating system; and means for tracking information relating to execution of the task or subtask acted upon by the operating system and combining said information with information relating to execution of all other tasks or subtasks associated with the application program.

14. The apparatus of claim 13, further comprising a data store for maintaining the information relating to execution of tasks, said data store being configured to distinctly maintain information relating to execution of tasks by a plurality of application programs.

15. The apparatus of claim 14, wherein the operating system maintains a system task list including a unique task identifier for each currently-active task, said task detection means comprising instructions for reading a unique task identifier for a currently-active task from the system task list and identifying an application program which spawned the currently-active task.

16. The apparatus of claim 15, wherein the operating system is configured to generate a callback message containing a task identifier when the operating system starts or ends execution of a task, said task detection means comprising instructions for searching said local data store for a corresponding entry including the task identifier, said task detection means determining that the task is being started when no corresponding entry is found in said local data store.

17. A client computer configured to track information relating to usage of application programs and report said information to a server computer, said client computer comprising:

an operating system configured to manage execution of an application program initiating a task capable of spawning one or more subtasks, wherein the operating system views each of said task and subtasks as a distinct executable program; and a program monitor coupled to said operating system, said program monitor comprising a software routine configured to monitor execution of tasks and subtasks by said operating system, identify an application program associated with said monitored tasks and subtasks, compile information relating to execution of all tasks and subtasks associated with the identified application program, and transmit said compiled information to the server computer.

18. The client computer of claim 17, wherein said operating system supports concurrent execution of multiple instances of an application program, said program monitor being further configured to concurrently compile information relating to execution of all of said multiple instances.

19. A client-server computer system for central tracking of application program usage by remote users, said client-server computer system comprising:

a client computer including a graphical user interface enabling a user to initiate execution of an application program, an operating system for managing execution of said application program, and a program monitor for compiling and reporting information relating to execution of said application program, said application program initiating execution of a task and zero or more subtasks, wherein the operating system views each of said task and subtasks as a distinct executable program, said program monitor being capable of associating said task and said subtasks with said application program, and said information compiled by said program monitor reflecting execution of each task and subtask associated with the application program; and a server computer coupled to said client computer, said server computer including a database for distinctly maintaining information relating to application program usage reported by a plurality of client computers.

20. The client-server computer system of claim 19, wherein said client computer communicates with said server computer over a hybrid fiber coax network.

21. The client-server computer system of claim 20, wherein said graphical user interface enables a user of said client computer to initiate execution of an application program providing access to an on-line service.

* * * * *